United States Patent
Brown et al.

(10) Patent No.: US 10,820,494 B1
(45) Date of Patent: *Nov. 3, 2020

(54) METHOD OF GENERATING A THREE-DIMENSIONAL MAP OF A LAWN AND ITS USE TO IMPROVE MOWING EFFICIENCY

(71) Applicant: Hydro-Gear Limited Partnership, Sullivan, IL (US)

(72) Inventors: Alyn G. Brown, Indianapolis, IN (US); David H. Dunten, Whitestown, IN (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/229,230

(22) Filed: Dec. 21, 2018

Related U.S. Application Data

(63) Continuation of application No. 14/918,455, filed on Oct. 20, 2015, now Pat. No. 10,188,029.

(Continued)

(51) Int. Cl.
  *A01D 34/00* (2006.01)
  *G05D 1/00* (2006.01)
  *G01C 21/00* (2006.01)

(52) U.S. Cl.
  CPC ......... *A01D 34/008* (2013.01); *G01C 21/005* (2013.01); *G05D 1/0027* (2013.01); *G05D 1/0088* (2013.01)

(58) Field of Classification Search
  CPC .................................................. A01D 34/008
  See application file for complete search history.

(56) References Cited

U.S. PATENT DOCUMENTS

| | | | | |
|---|---|---|---|---|
| 5,956,250 | A | * | 9/1999 | Gudat ................... G05D 1/027 701/26 |
| 6,008,756 | A | * | 12/1999 | Boerhave ............. A01B 79/005 342/357.52 |

(Continued)

FOREIGN PATENT DOCUMENTS

| EP | 3146823 | 3/2017 |
|---|---|---|
| EP | 2798420 | 4/2017 |

(Continued)

OTHER PUBLICATIONS

Final Report for the Multi-Autonomous Ground-robotic International Challenge (MAGIC) 2010, dated Dec. 14, 2010, 29 pp.

(Continued)

*Primary Examiner* — Donald J Wallace
(74) *Attorney, Agent, or Firm* — Neal, Gerber & Eisenberg LLP

(57) ABSTRACT

A method is provided for generating a three-dimensional geographical map of a lawn using a mower equipped with sensors for monitoring geographic location, pitch and roll, comprising the steps of: periodically acquiring position, pitch and roll data as the lawn is mowed; transmitting the geographic location, pitch and roll data to a computer processor; and processing the geographic location, pitch and roll data to generate the map. The method is useful for enhancing mowing efficiency and managing the activities of a fleet of mower units.

21 Claims, 5 Drawing Sheets

Related U.S. Application Data

(60) Provisional application No. 62/066,211, filed on Oct. 20, 2014.

(56) References Cited

U.S. PATENT DOCUMENTS

| | | | | |
|---|---|---|---|---|
| 6,199,000 | B1* | 3/2001 | Keller | A01B 79/005 701/50 |
| 6,604,348 | B2* | 8/2003 | Hunt | A01D 34/008 56/10.2 R |
| 7,010,425 | B2* | 3/2006 | Gray | A01B 69/008 172/2 |
| 7,894,951 | B2* | 2/2011 | Norris | H04L 67/12 180/443 |
| 8,073,564 | B2* | 12/2011 | Bruemmer | G05D 1/0027 700/245 |
| 8,195,331 | B2* | 6/2012 | Myeong | G05D 1/0274 134/18 |
| 8,200,428 | B2* | 6/2012 | Anderson | G05D 1/0287 701/453 |
| 8,271,132 | B2* | 9/2012 | Nielsen | B25J 9/161 318/568.17 |
| 8,396,597 | B2* | 3/2013 | Anderson | G05D 1/0274 700/259 |
| 8,473,187 | B2* | 6/2013 | Kammel | G01C 21/005 701/469 |
| 8,645,016 | B2* | 2/2014 | Durkos | G05D 1/0219 700/245 |
| 8,649,260 | B2* | 2/2014 | All | G08B 25/009 370/225 |
| 9,066,464 | B2* | 6/2015 | Schmidt | A01B 69/00 |
| 9,149,167 | B2* | 10/2015 | Hong | A47L 9/009 |
| 9,339,163 | B2* | 5/2016 | Noh | G05D 1/0231 |
| 9,462,748 | B2* | 10/2016 | Dollinger | B65G 67/24 |
| 9,796,089 | B2* | 10/2017 | Lawrence, III | B23Q 17/2233 |
| 10,188,029 | B1* | 1/2019 | Brown | A01D 34/008 |
| 2002/0156556 | A1* | 10/2002 | Ruffner | G01S 5/02 701/23 |
| 2004/0068352 | A1* | 4/2004 | Anderson | A01B 69/008 701/25 |
| 2004/0111196 | A1* | 6/2004 | Dean | A01D 34/008 701/23 |
| 2006/0213167 | A1* | 9/2006 | Koselka | A01B 79/005 56/10.2 A |
| 2006/0235611 | A1* | 10/2006 | Deaton | G01C 15/00 701/491 |
| 2008/0262669 | A1* | 10/2008 | Smid | G05D 1/0278 701/23 |
| 2011/0060495 | A1* | 3/2011 | Kono | G08G 1/096833 701/31.4 |
| 2011/0150348 | A1* | 6/2011 | Anderson | G05D 1/0088 382/224 |
| 2011/0295424 | A1* | 12/2011 | Johnson | G05D 1/0274 700/248 |
| 2012/0237083 | A1* | 9/2012 | Lange | G06F 16/29 382/103 |
| 2013/0041526 | A1* | 2/2013 | Ouyang | A01D 34/008 701/2 |
| 2013/0041549 | A1* | 2/2013 | Reeve | G05D 1/0278 701/28 |
| 2013/0192185 | A1* | 8/2013 | Hwang | A01D 34/008 56/10.2 A |
| 2013/0238130 | A1* | 9/2013 | Dorschel | G05D 1/0274 700/259 |
| 2014/0371979 | A1* | 12/2014 | Drew | G07C 5/008 701/32.3 |
| 2015/0025755 | A1* | 1/2015 | Willgert | A01B 69/007 701/50 |
| 2015/0366129 | A1* | 12/2015 | Borinato | B60L 53/60 701/25 |
| 2016/0100521 | A1* | 4/2016 | Halloran | G01S 7/4868 180/169 |
| 2016/0100522 | A1* | 4/2016 | Yamauchi | A01D 34/008 701/25 |
| 2016/0165795 | A1* | 6/2016 | Balutis | G05D 1/0088 701/25 |
| 2016/0275211 | A1* | 9/2016 | Shuler | G06F 30/13 |
| 2018/0004217 | A1* | 1/2018 | Biber | G05D 1/0274 |

FOREIGN PATENT DOCUMENTS

| | | |
|---|---|---|
| WO | WO2000010063 | 2/2000 |
| WO | WO2008005661 | 1/2008 |

OTHER PUBLICATIONS

Magic 2010 Down Under, Multi Autonomous Ground-robotic International Challenge, US Army RDECOM, Australian Government, 2010, 2pp.

Olson, et al., "Exploration and Mapping with Autonomous Robot Teams Results from the MAGIC 2010 Competition," University of Michigan, 2013, 7pp.

Bosch, Press Release, Robotic lawnmower Indego 1200 Connect from Bosch, Aug. 2014, 4 pp.

* cited by examiner

METHOD OF GENERATING A THREE-DIMENSIONAL MAP OF A LAWN AND ITS USE TO IMPROVE MOWING EFFICIENCY

CROSS-REFERENCE

This application is a continuation of U.S. Non-Provisional patent application Ser. No. 14/918,455, filed on Oct. 20, 2015, which claims the benefit of U.S. Provisional Patent Application No. 62/066,211, filed on Oct. 20, 2014. These prior applications are incorporated herein by reference in their entirety.

FIELD

The present invention relates to utility vehicles, and more particularly to an interactive sensor, communications, and control system for utility vehicles such as zero turn radius lawnmowers, autonomous ground maintenance equipment and the like.

BACKGROUND

Applicants herein disclose a method for generating a three-dimensional terrain map of a commercial or residential lawn, and using the map to improve mowing efficiencies. This method and the related system may be used in connection with a utility vehicle such as a zero turn radius lawnmower. Zero turn radius utility vehicles exist today in a wide variety of forms and types, with lawnmowers being among the more common. Typically, the propulsion system for a zero turn radius lawnmower consists of an internal combustion engine. The output from the internal combustion engine is then coupled to one or more pulleys for turning at least two different drive systems.

The primary drive system of the internal combustion engine is the vehicle traction driver that is responsible for moving the vehicle by converting the rotary output of the internal combustion engine into rotary movement of the vehicle's wheels. The output shaft of the engine is coupled (usually via a pulley) to the input shaft of a hydraulic pump, which is part of a hydrostatic transmission. The hydrostatic transmission uses the flow of pumped fluids to ultimately turn a gear train that turns the driven wheels of the lawnmower. The secondary drive system is usually a tool driver that includes a pulley that drives a tool, such as the blades of a lawnmower. Other tools driven by the tool driver system can include snow blowers, tillers, brushes and the like. A zero turn vehicle may use a single hydrostatic transmission with two independently controllable outputs or two separate hydrostatic transmissions with separate pumps and separate outputs. By independently controlling the first and second outputs, one can independently control the operation of the first and second driven wheels.

For example, driving the driven wheels at the same speed in the same direction will cause the lawnmower to generally move in a straight line. However, by varying the relative speed of the right and left driven wheels, one can cause the vehicle to turn as a result of this difference in speed. If the wheels are rotated so that one wheel, such as the right wheel, is driven forward, and the other wheel, such as the left wheel, is driven in reverse, the vehicle will turn on its axis, and as such, have a "zero turn radius" that gives the name to this particular type of utility vehicle.

Another type of propulsion system is a hybrid propulsion system, wherein an internal combustion engine is provided whose primary purpose is to drive an alternator to thereby generate electricity. The electricity so generated is stored in a storage battery. Electricity from the storage battery is then directed to one or more electric motors. The electric motors are operatively coupled to the driven wheels through a gear reduction member so that the rotation of each motor rotates a driven wheel.

Utility vehicles of the type described above have been used for many years with generally acceptable results. Nonetheless, room for improvement exists. Additionally, many utility vehicles are used as a part of a fleet of devices that are operated by mowing contractors, golf courses, businesses, landlords, universities, municipalities and the like. The use of such utility vehicles involves management issues relating to scheduling the proper utility vehicle for the job for which it is being used, scheduling operators for the utility vehicles, and performing maintenance on the utility vehicles. A factor that exacerbates the management issues is the fact that the utility vehicles are being operated in the field at the location of the customer, rather than being operated close to the company's headquarters. As such, it is often difficult for management to maintain proper oversight on events that are transpiring during the operation of the utility vehicles. One embodiment disclosed herein includes a communications system that is operable between a vehicle and its operator and between the vehicle operator and a remote location. The communication system can enable an owner and/or operator of a vehicle to monitor the condition and operational parameters of the particular vehicle even when it is operated remotely.

GPS equipment manufacturers have developed several tools to help farmers and agri-businesses become more productive and efficient in their precision-farming activities. Today, many farmers use GPS-derived products to enhance their farming operations. Location information is collected by GPS receivers for mapping field boundaries, roads, irrigation systems, and problem areas in crops such as weeds or disease. The accuracy of GPS equipment allows farmers to create maps with precise acreage of field areas, road locations and distances between points of interest. GPS capabilities allow farmers to accurately navigate to specific locations in the field, year after year, to collect soil samples or monitor crop conditions.

SUMMARY

In accordance with one embodiment of the present application, a monitoring system is provided for a utility vehicle, and in particular, a zero turn radius type utility vehicle such as a lawnmower. The monitoring system includes a processor and one or more sensors that are in communication with the processor, to report on various sensed parameters of the utility vehicle to the processor.

The processor can include an onboard processor having a transceiver for transmitting information received from onboard sensors. The information can be processed by the processor and then transmitted to a near range electronic device, such as a mobile phone, a computer, a portable computing device, and the like. This communication can occur through either a Bluetooth or Wi-Fi type connection. The near range electronic device also includes a transmitter that is capable of transmitting information to a far range electronic device, such as a remote computer, that may be positioned at a location such as a fleet supervision center, a user's home or a service center for monitoring the location of the utility vehicle.

Another embodiment of the present application includes a data gathering system for gathering information about the location and operation of a vehicle such as a lawnmower or other utility vehicle, and a communication system for communicating sensed information to a remote location, such as a supervision center, home computer or service center. This enables other operators who are spatially separated from the vehicle to monitor its activities. For example, by transferring the information to a fleet supervision center, a supervisor of a fleet of vehicles can obtain real time information about the location and operation of the vehicles. This not only helps the fleet supervisor manage scheduling for a fleet of utility vehicles, but also helps to manage the personnel operating the vehicles.

A first aspect of the present application includes a method for generating a map of a lawn using a mower equipped with a sensor for monitoring geographic location, comprising the steps of periodically acquiring geographic location data as a lawn is mowed; transmitting the geographic location data to a computer processor; and processing the geographic location data to generate the map.

Features of this aspect can include one or more sensors periodically acquiring and transmitting data to the computer processor where the data can include pitch and roll, speed, velocity, acceleration, power usage, fuel usage, instantaneous power usage, instantaneous fuel usage, total power usage, and total fuel usage.

Further features of this aspect can include the mapping of both residential and commercial lawns. This may include a map that is two-dimensional or three-dimensional, or is a contour map, a map stored as a data file, a map displayed on a printout, on a computer screen, on a cell phone screen or on other portable electronic devices. The map may provide information about the perimeter of the lawn, as well as the size, shape and location of non-mowable sections within the perimeter. The map may identify non-mowable sections using text, color code, hash marks, or a combination thereof.

Still further features of this aspect can include a map which indicates a recommended mower type, a recommended mowing path, a recommended mowing path with increased efficiency or safety, a project time, and a project power or fuel usage. Features can also include a map which can be transmitted to a handheld computing device, a portable communication device, an operator's cell phone, a laptop, and an onboard processor for storage or display.

Another feature of this aspect can include an autonomous mower, where a map provides mowing parameters for the robotic mower including a path of travel and a speed and acceleration along the path for the autonomous mower.

Another aspect of the present application is a method for using a plurality of lawn maps for a client base to efficiently schedule activities of a fleet of commercial mower units.

DETAILED DESCRIPTION

Figure 1:
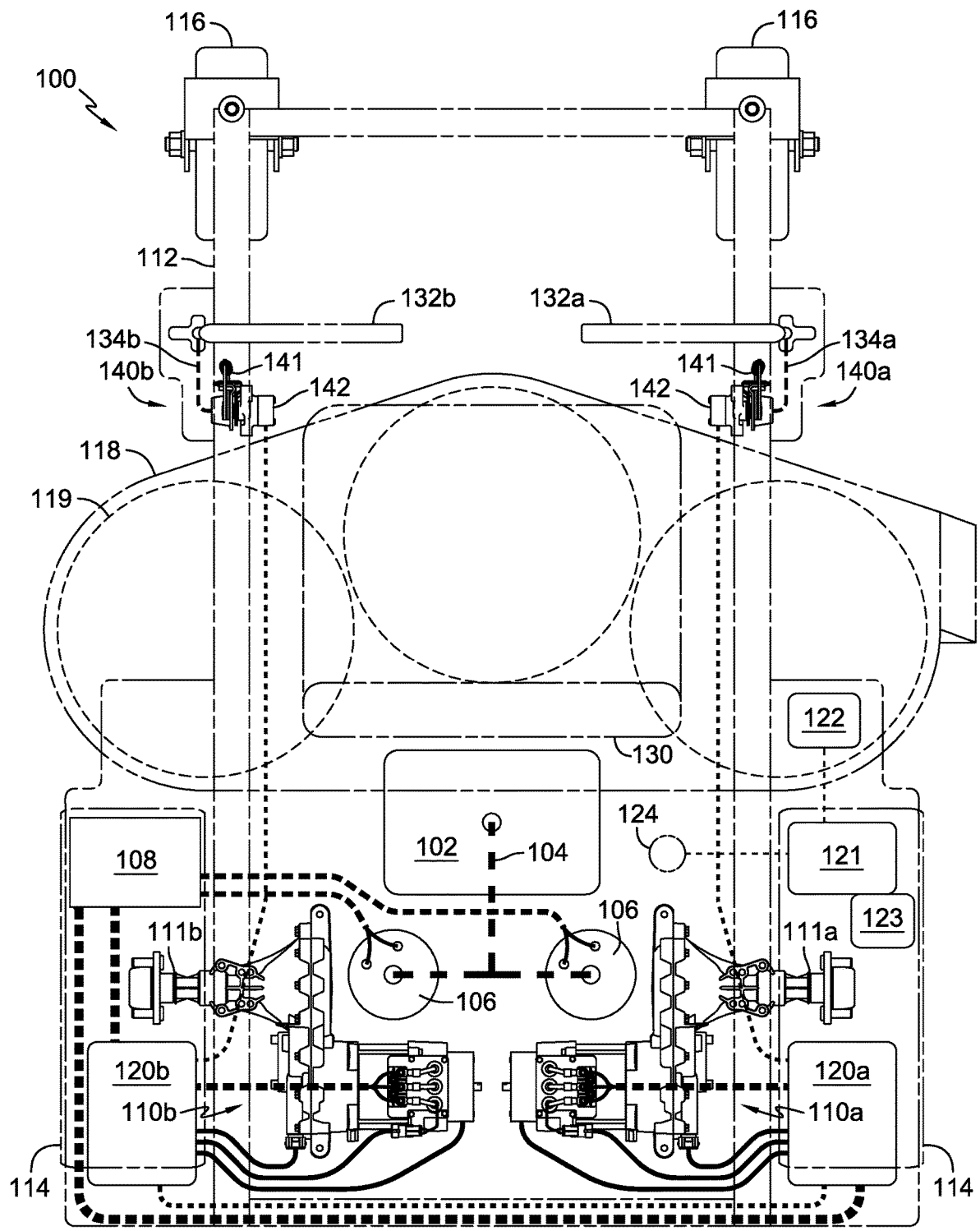
FIG. 1 is a partially schematic plan view of an exemplary hybrid utility vehicle, namely a zero turn radius lawnmower incorporating components of the systems disclosed herein.

The description that follows describes, illustrates and exemplifies one or more particular embodiments of the present application in accordance with its principles. This description is not provided to limit the invention to the embodiment(s) described herein, but rather to explain and teach the principles of the invention in such a way to enable one of ordinary skill in the art to understand these principles and, with that understanding, be able to apply them to practice not only the embodiment(s) described herein, but also other embodiments that may come to mind in accordance with these principles. The scope of the present application is intended to cover all such embodiments that may fall within the scope of the appended claims, either literally or under the doctrine of equivalents.

In the present age, with concerns over pollution and energy consumption, the present application provides time and cost benefits to an individual homeowner who may mow his/her lawn, e.g., once a week for one-third of the year. The invention provides additional benefits for commercial lawn mowing businesses, which may employ a fleet of mowing units.

Commercial and residential lawns can be categorized as ornamental turf. Unlike crop fields, where grasses are considered a nuisance, lawns are generally comprised of a variety of grasses largely for aesthetic purposes. While crops are planted and harvested on a seasonal basis, lawns require regular maintenance throughout the growing season. This maintenance can include applying herbicidal treatments, fertilizing, watering, and mowing.

Commercial and residential lawns come in a wide variety of sizes. For example, residential lots in the US are generally about ¹⁄₁₀ to about 10 acres, more often about ⅛ to about 2 acres. According to a recent US census report, the average single-family home sold in 2013 was built on a 15,454 sq. ft. lot, or approximately ⅓ of an acre (1 acre is equivalent to 43,560 sq. ft.). Commercial lot sizes typically range from about ¹⁄₁₀ to hundreds of acres, depending on the size of the business, its location, and the relevant zoning restrictions.

Commercial and residential lawns come in a variety of shapes from regular geometric (e.g., rectangular or square-shaped) to completely amorphous, but are generally somewhere in between. Even where lots are similarly-shaped, as in some modern sub-divisions, the mowing surfaces can be quite different due to the presence and location of trees, flower beds, gardens, bridges, gazebos, sidewalks, walking paths, patios, driveways, retainer walls, water features, and building structures (e.g., primary dwellings, storage sheds, detached garages, and mini-barns). In addition, lawn topography can vary with the presence of mounds, hills, ditches, cliffs, banks, streams, lakes and ponds.

Because commercial and residential lawns have unique characteristics, optimized mowing parameters are inherently lawn-specific. The present application discloses methods for mapping a lawn and using this map to generate best practices for mowing such lawn, and a method of using a plurality of lawn maps for a plurality of clients to efficiently operate a fleet of lawn mowing units for a lawn-care business.

The methods disclosed herein can potentially be applied to any mower type. FIG. 1 depicts one embodiment of a riding utility vehicle 100, which by way of example only is a zero turn hybrid lawn mower. Various components of vehicle 100 can be mounted on and supported by a frame 112. In particular, an engine 102, one or more alternators 106, a battery 108, a set of electric zero turn transaxles 110a, 110b, and traction controllers 120a, 120b can be mounted on frame 112. Frame 112 also supports a deck 118, which may be of fixed height (relative to ground), ground-following, or height adjustable as known in the art. Deck 118 can include mowing blades 119 and is intended to be representative not only of blades but of other ground engaging equipment such as brush cutters, aerators, and the like. An operator seat 130 is positioned above deck 118 and is also affixed to frame 112. Frame 112 is supported above ground by a pair of caster wheels 116 and a pair of driven wheels 114.

Engine 102, such as a gasoline or diesel type internal combustion engine, drives the alternator(s) 106 via a belt and pulley assembly 104. Alternators 106 generate electric power to charge the battery 108, and it will be understood that alternator(s) 106 can be replaced with one or more generators. Battery 108 supplies electric power to a set of electric zero turn transaxles 110a, 110b. Electric zero turn transaxles 110a, 110b provide rotational output through a pair of output shafts 111a, 111b to rotationally drive the driven wheels 114.

Traction controllers 120a, 120b can control the speed and direction of driven wheels 114 by controlling respective electric zero turn transaxles 110a, 110b, based on inputs from an operator (sitting in operator seat 130). Traction controllers 120a, 120b are mounted near the rear of vehicle 100 near electric zero turn transaxles 110a, 110b away from engine 102 to aid in cooling, although other locations are possible. The operator can provide speed and direction inputs through a pair of drive levers 132a, 132b. Drive levers 132a, 132b can connect to a pair of control assemblies 140a, 140b via corresponding mechanical linkages 134a, 134b. Control assemblies 140a, 140b can each include a mechanical return to neutral (RTN) mechanism 141 and a potentiometer 142 to communicate the position of drive levers 132a and 132b to traction controllers 120a and 120b respectively.

Based on the position of drive levers 132a, 132b, potentiometers 142 can provide varying inputs to traction controllers 120a, 120b so that electric zero turn transaxles 110a, 110b (and driven wheels 114) are driven as desired by the operator. In the absence of inputs from the operator, RTN mechanisms 141 can force the drive levers 132a, 132b to a neutral position. Front caster wheels 116 react in response to the actions of rear driven wheels 114.

Internal combustion engine 102 contains a downwardly extending output shaft (not shown), which can serve two functions. The first function can be driving a generator or alternator 106 that generates electricity for operating electric zero turn transaxles 110a, 110b that drive driven wheels 114 of utility vehicle 100. A second function can include driving a rotatable accessory output device, tool, implement or attachment such as rollers, brushes, tillers, spreaders, sprayers or other power driven accessories.

A common feature shared by many of the mower attachments is that they are driven by a belt that is coupled to the output shaft of internal combustion engine 102. The rotation of engine 102 turns a pulley that, through a belt, drives the accessory devices, such as blades 119. Energy that is stored in battery 108 is then delivered by wiring to traction controllers 120a, 120b that control the current from battery 108, and direct the current to the proper components of utility vehicle 100.

The transaxle arrangement shown in FIG. 1 contemplates a single transaxle being used for each of two driven wheels 114 of a four wheel vehicle. In other embodiments, other numbers and ratios of transaxles to driven wheels are contemplated. Additional details of a vehicle similar in many respects to vehicle 100 can be found in commonly owned U.S. patent application Ser. No. 14/693,255, the disclosure of which is incorporated herein by reference.

Each of the electric zero turn transaxles 110a, 110b includes an electric motor and a gear box that, in most cases, would comprise a reduction gear box to maximize the RPM efficiency of the electric motor. The gear boxes are coupled to their respective driven wheels 114. It will be understood that such gear boxes are not necessary in all situations and the internal details of such gear boxes are known to persons of skill in the art.

Figure 2:
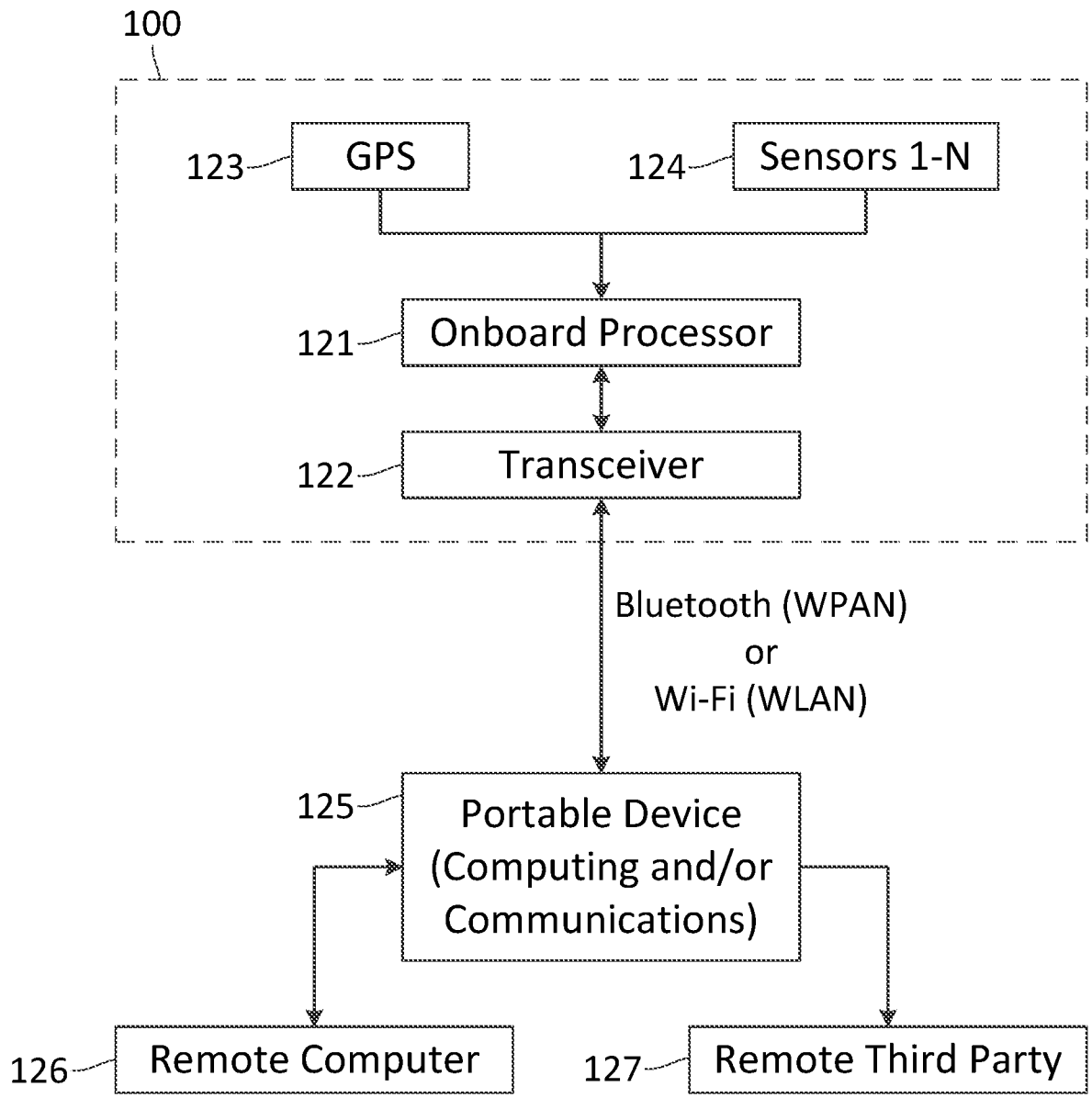
FIG. 2 is a diagram illustrating components of one embodiment of a monitoring system disclosed herein that can be used in connection with the vehicle of FIG. 1.

FIG. 2 shows components of an interactive system of the present application. A utility vehicle, such as zero turn radius lawnmower 100 is provided that includes an onboard transceiver 122, a GPS unit 123 and a plurality of sensors 124. The GPS unit 123 is provided for serving as a geo-location device for vehicle 100, so that the location of vehicle 100 can be determined at any particular time. A plurality of sensors 124 is provided for sensing various conditions and parameters of vehicle 100.

An onboard processor 121 is provided for processing the various data streams fed to it by the sensors 124 and the GPS unit 123. The onboard processor 121 may comprise a digital computer, or a small dedicated processing unit that is capable of processing the data that is provided by the sensors 124 and the GPS unit 123.

A preferred onboard processor 121 will have sufficient processing capabilities to handle the tasks at hand, while being inexpensive enough to minimize additional costs. Additionally, onboard processor 121 should have appropriately low power draw requirements and should be designed to be ruggedized to operate in the often harsh outdoor environment in which vehicle computers operate. To that end, onboard computers such as processor 121 should preferably have a casing that is waterproof, dustproof and capable of withstanding temperature extremes.

Onboard processor 121 is in communication with a transceiver 122, which may be included as part of onboard processor 121. Transceiver 122 is designed to transmit data between the onboard processor 121 and some outside, near range data processing (computing and/or communications) portable device 125. It should be noted that the near range data processing portable device 125 may be referred to herein simply as "portable device 125" or "portable communication device 125" or "handheld computing device 125." Preferably, transceiver 122 transmits data to and receives data from the portable device 125 via either a Bluetooth signal or a Wi-Fi signal. Bluetooth and Wi-Fi type signals would not entail the expense of employing a "constant on" cellular phone line. It is also important that transceiver 122 be ruggedized to withstand the harsh environment in which a utility vehicle operates. Examples of such near range data processing devices include mobile devices that are held, carried or worn by the user, such as smartphones, smart watches, or various computing devices, such as tablets and the like, which can be incorporated into the vehicle or carried on the vehicle.

A portable communication device 125 can serve several major functions in connection with the communication system. The first function served by the portable communication device 125 is to receive information from the onboard processor 121. As many smartphones are capable of receiving each of Bluetooth, Wi-Fi and cellular phone signals, a smartphone can be employed to receive either a Bluetooth or Wi-Fi signal from transceiver 122 that is coupled to onboard processor 121. A second function served by portable communication device 125 is to serve as a processor, or adjunct processor for onboard processor 121.

One way in which the communications system can be configured is to employ a fairly sophisticated onboard processor that can process the data received by the sensors 124 and GPS unit 123, and then push the processed data onto the portable communication device 125 to display and/or transmit the data without significant further processing. Alternately, the onboard processor 121 can be a less sophisticated processor whose primary duty is to receive information from the sensors 124 and GPS unit 123, and then to transmit it to the portable communication device 125. In such cases, the portable communication device 125 would perform the majority of the work in processing the raw data received by the sensors 124 and GPS unit 123 into a useable format for transmission or display. A third function performed by the portable communication device 125 is to serve as a display to enable the user to review the various parameters and data items that are being output to it by the onboard processor 121.

In an alternate embodiment, a display screen is incorporated into the utility vehicle 100, in much the same manner that in-cabin touch screen displays exist on many automotive vehicles. However, one benefit of using the portable communication device 125 as a vehicle display is that you reduce the cost of the vehicle, and enable the communication system of the present application to be more easily and less expensively retro-fit onto existing vehicles. In this regard, it will be appreciated that many existing vehicles likely do not include displays. Therefore, the use of the portable communication device 125 for displaying the output data obviates the need for the user during a retrofit to mount a screen onto the utility vehicle 100.

In another embodiment, a function performed by the portable communication device 125 can be as a user interface to input data into the onboard processor 121. One example of such input data would include sending commands to onboard processor 121 selecting which particular data set to display; or, to program the data processor to appropriately receive data from the sensors 124 that are provided on utility vehicle 100.

In a further embodiment, a function served by the portable communication device 125 is to serve as a processor of data received by the portable communication device 125 from the onboard processor 121. Limitations in the onboard processor 121 may require that the data processed by the onboard processor 121 and transmitted by the onboard processor 121 to the portable communication device 125 might be further processed in order to be in a user-friendly format. The processor within the portable communication device 125 may be capable of performing these more advanced processing functions.

In another embodiment, a function performed by the portable communication device 125 is to transmit data to a remote computer 126. The remote computer 126 may be located at the user's residence, or the utility vehicle owner's place of business, such as a fleet supervision center. By having the capability of transmitting the close-to-real time data from utility vehicle 100 to the fleet supervision center, supervisory personnel can monitor the operation and condition of utility vehicle 100 without being forced to travel out to the field to observe utility vehicle 100. Additionally, the data transmitted to the fleet supervision center can enable fleet supervisors to better monitor the individual who is driving the lawnmower or utility vehicle 100, to thus help determine whether the employee is working or on a break; and to also help determine the efficiency of the operator and other parameters relating to operation of utility vehicle 100.

Figure 4:
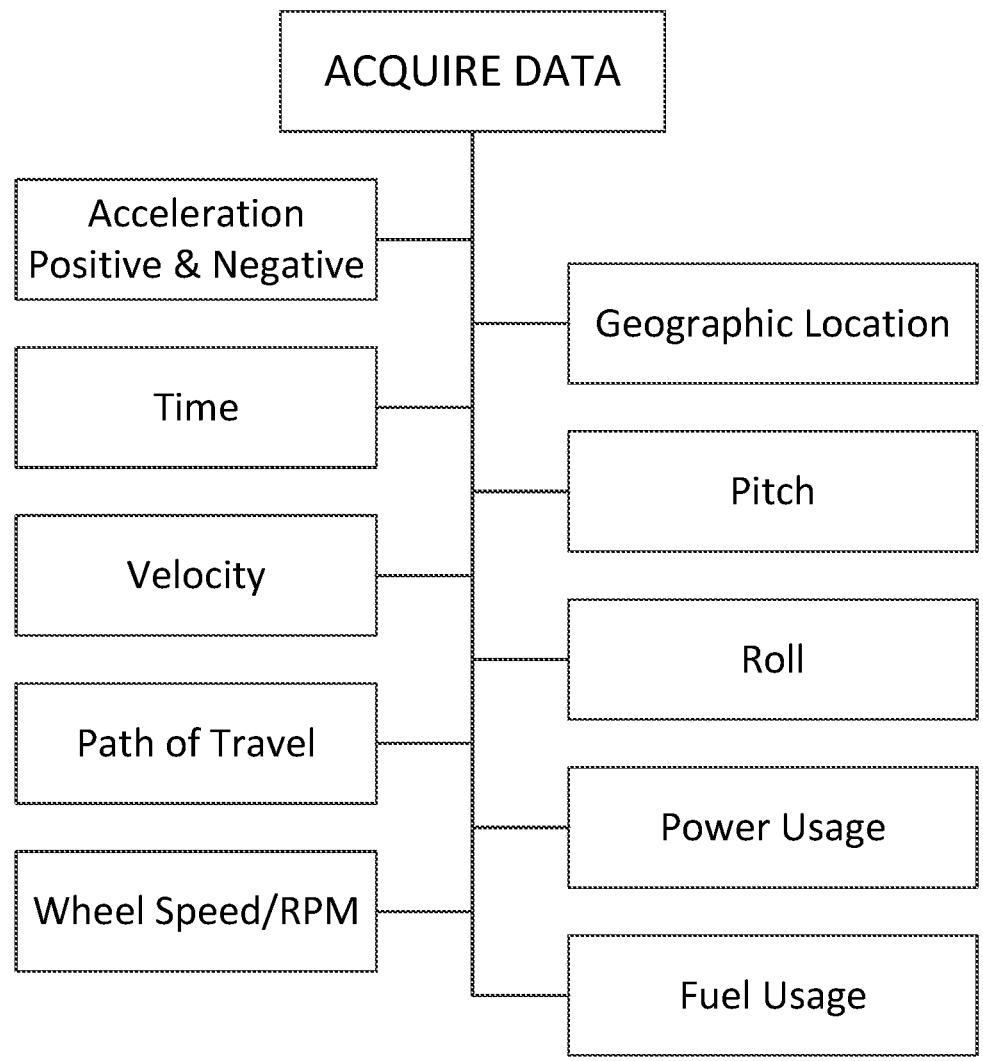
FIG. 4 is a diagram of data inputs used to generate a three-dimensional terrain map of a lawn.

FIG. 4 shows representative types of data inputs that can be used to generate a three-dimensional map of a commercial or residential lawn. In one embodiment, a lawn mower is equipped with a sensor (such as, but not limited to, GPS equipment) to at least measure geographic location. In another embodiment, the sensor can also measure pitch and roll. Pitch and roll are terms commonly used in aviation. As used herein, "pitch" refers to the amount of front/back tilt of the mower body while "roll" refers to the amount of side-to-side tilt. Thus, at each point on the lawn where a geographic-location data point is acquired, pitch and roll data can also be acquired.

While geographic location and pitch/roll data are adequate for generating a three-dimensional terrain map of a lawn, dynamic data collection and processing can also be useful to accurately determine time and cost of mowing a lawn as a whole or on an area-by-area basis. For example, time and instantaneous power usage can be acquired as a function of position while the lawn is being mowed according to a particular path of travel. The velocity (or speed) of a mower and its acceleration (or deceleration) at each of a set of geographic-position points is valuable as well, since features in the lawn which cause changes in lawn mower velocity and acceleration also add additional time and energy costs to a job.

Another useful sensor measures wheel speed and RPM, providing valuable information about speed variations of the vehicle. This information can be coupled with information from other sensors, such as a GPS device, to provide geo-tracking data to enable a supervisor or a software program monitoring the system to determine the particular speed of a vehicle in various locations on the lawn being mowed. By obtaining and processing this data, one can determine improved and more efficient work paths for an operator and a lawnmower on a particular plot of land on which the operator or lawnmower is operating.

The monitoring system can include a GPS unit 123 so that the location of vehicle 100 can be monitored. As discussed above in connection with the wheel speed data provided by an RPM sensor, the GPS and wheel speed data can be correlated to provide information about the speed at which the vehicle can operate in the various areas of a plot in which it is operating. With this information, a supervisor or a software program has the ability to determine ways to improve performance, such as by finding alternate routes at which the vehicle can operate more quickly, or monitoring the lawnmower operator to determine whether the operator is either moving too quickly to be operating safely, or too slowly to be efficient.

A tachometer or engine speed sensor can also provide valuable information about the operation of the vehicle. For example, most engines tend to have an optimum operating speed, wherein the power delivered by the engine per unit of fuel used is optimized, or else a particular engine speed at which engine wear is reduced and durability increased for a particular engine. By comparing these desired parameters with actual engine speeds, one can gain insight into whether the engine is being operated efficiently, and whether the operator is operating the engine in an efficient operational range. For example, an overly high tachometer reading might suggest that the operator would be better served by running the vehicle in a higher gear, or that the user is driving the vehicle too quickly to be doing a careful job on the lawn being mowed.

A fuel consumption rate sensor is related to the fuel flow sensor, and helps to provide much of the information discussed above.

An accelerometer can be provided for determining the pitch and roll and acceleration of the vehicle. It is helpful to monitor pitch and roll parameters to help determine both the operational efficiency of the vehicle and also the safety of the intended operation of the vehicle. For example, if a particular device has a maximum acceptable roll angle of 30 degrees from horizontal, the indication by an accelerometer that the vehicle is being operated at a 40 degree angle would suggest that the vehicle is being operated outside its preferred safety range.

In a case with a lawnmower, the monitor and operator may wish to discuss alternate mowing paths wherein the grass to be mowed can still be mowed without the lawnmower operating outside the safety range. For example, if driving the mower along the side of a hill causes the vehicle to lean over past its acceptable roll point, the monitor can instruct the user to operate the vehicle by driving up and down the hill, rather than sideways around the hill. Driving up and down the hill may be safer as the vehicle might be more stable over a greater angle when moving up and down a hill than sideways around it. Alternately, there may be some hill areas that are too steep to mow with a riding lawnmower safely either sideways around the hill or vertically up and down the hill and, as such, should be cut with a walk behind mower or other special equipment that is designed for handling such steep hills.

A time sensor may be employed to feed data into the processor. The time sensor can be used to provide information relating to the time of operation of the vehicle. This timer might include not only the elapsed time during which the vehicle is operated, but also the time period in which it operates.

The various parameters discussed above can be fed into the onboard processor 121. The onboard processor 121, which then processes the information and transfers it to a near range display and transmitting device, such as a portable communication device 125. It will be noted that the portable communication device 125 can have a GPS and an accelerometer. The use of GPS and an accelerometer on portable communication device 125 would obviate the need for an accelerometer and GPS to be installed on the vehicle. Many portable devices such as smartphones and tables already have GPS capabilities and accelerometers.

A major purpose served by the portable device 125 is use as a display, processor and programming device. Current smartphones and tablets include significant processing capability. As such, the processing capability of a smartphone or tablet may enable the fleet operator to use a less expensive, less sophisticated onboard processor for the vehicle, and to employ the processor in the portable device 125 to perform the processing tasks, rather than the onboard processor 121. As such, the onboard processor 121 could be a processor that does little more than receive the input data from the sensors, and transmit it via Bluetooth or Wi-Fi to the portable device 125. The handheld computing device's processor could then process the information into useable reports and displays, and also correlate various parameters, such as speed and GPS, to provide other useful information to the user.

One way to display the information that is gathered by the sensors 124 and processed by the processor is to provide an onboard display (not shown) that is placed on a dashboard or stalk (not shown) that is affixed to the vehicle 100. Although such a display could be employed on a lawnmower, the need to have the display ruggedized to withstand the harsh conditions normally encountered by the lawnmower, such as rain, snow and the like, would add to the cost of the display. Additionally, many older vehicles exist that do not include displays, but that already include electronic sensors, that could, through the application of a suitable processor and programming, be capable of forwarding information from the lawnmower to a portable device 125 for display. On such older vehicles, it might be cost prohibitive to retro-fit the vehicle with the display screen and therefore might be more cost-effective to rely on the display screen that is already contained within the portable device 125.

To make the display visually accessible to the user, the vehicle can include a cradle for holding the portable device 125. The cradle is preferably positioned somewhere within the user's normal operative viewing area, so that the user can view the display while operating the lawnmower without taking his head and focus away from the area which he is mowing. Preferably, any such cradle includes a charger to help charge the portable device 125 so that it does not run out of power while being used.

A further desirable feature of the portable device 125 is the ability to use it as a programming tool. As such, the portable device 125 can transmit information to the onboard processor 121, to either program the processor to perform certain functions relating to the sensors or the transmission of the sensed information; or alternately, to program the sensor to perform certain functions with the vehicle 100.

In another embodiment, a near range portable device 125 is capable of transmitting its information to a remote data processor/display device. One such far range electronic device can include a remote computer 126 that is, for example, at a user's home or at a company office wherein supervisory or monitoring personnel can analyze or monitor the parameters of the various vehicles being used. Alternatively, the information can be transmitted to a remote third party 127, such as a software developer, licensee or subcontractor.

Figure 3:
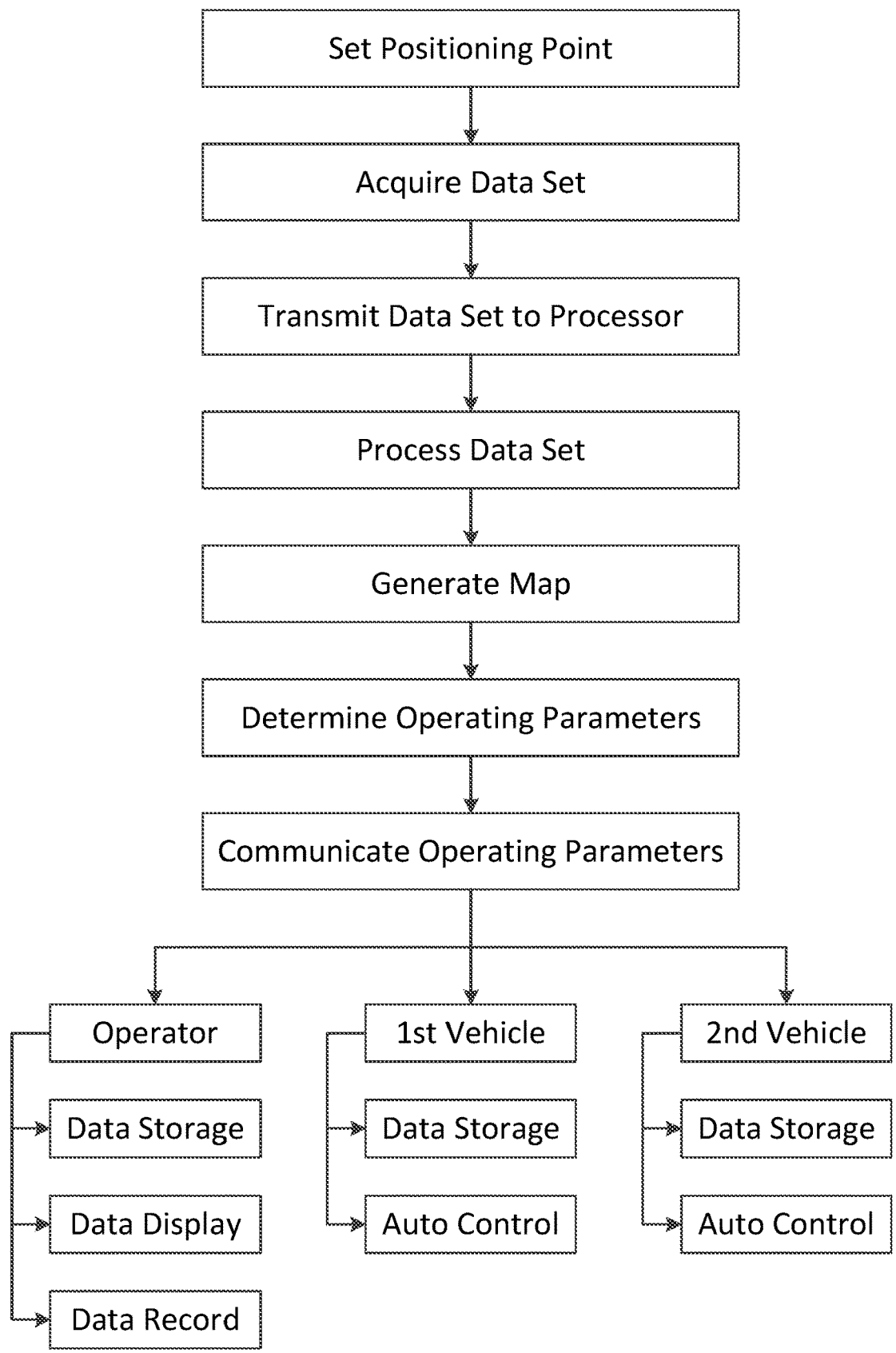
FIG. 3 is a diagram of a method for generating and using a three-dimensional terrain map of a lawn.

FIG. 3 provides a diagram of one embodiment of the invention. In this embodiment, a lawnmower is equipped with one or more sensors, depending on the parameter(s) to be measured. Using this sensor-equipped mower, an operator mows a complete mowable surface of the lawn, maneuvering around building structures and features. During this mapping phase, the path chosen by the operator is not critical. In a particular example, the operator locates the mower at an initial positioning point. Setting the mower at the initial position can be utilized to determine the relative geographic location of the data being collected by the lawnmower. As the mower moves about, the sensor(s) acquire data as a function of geographic location and transmit the data to a computer processor for storage in a data file. The computer processor can be located on the mower itself or at a remote location. When the lawn, or a section thereof, is completely mowed, the data file can be closed and ready for processing.

Figure 5:
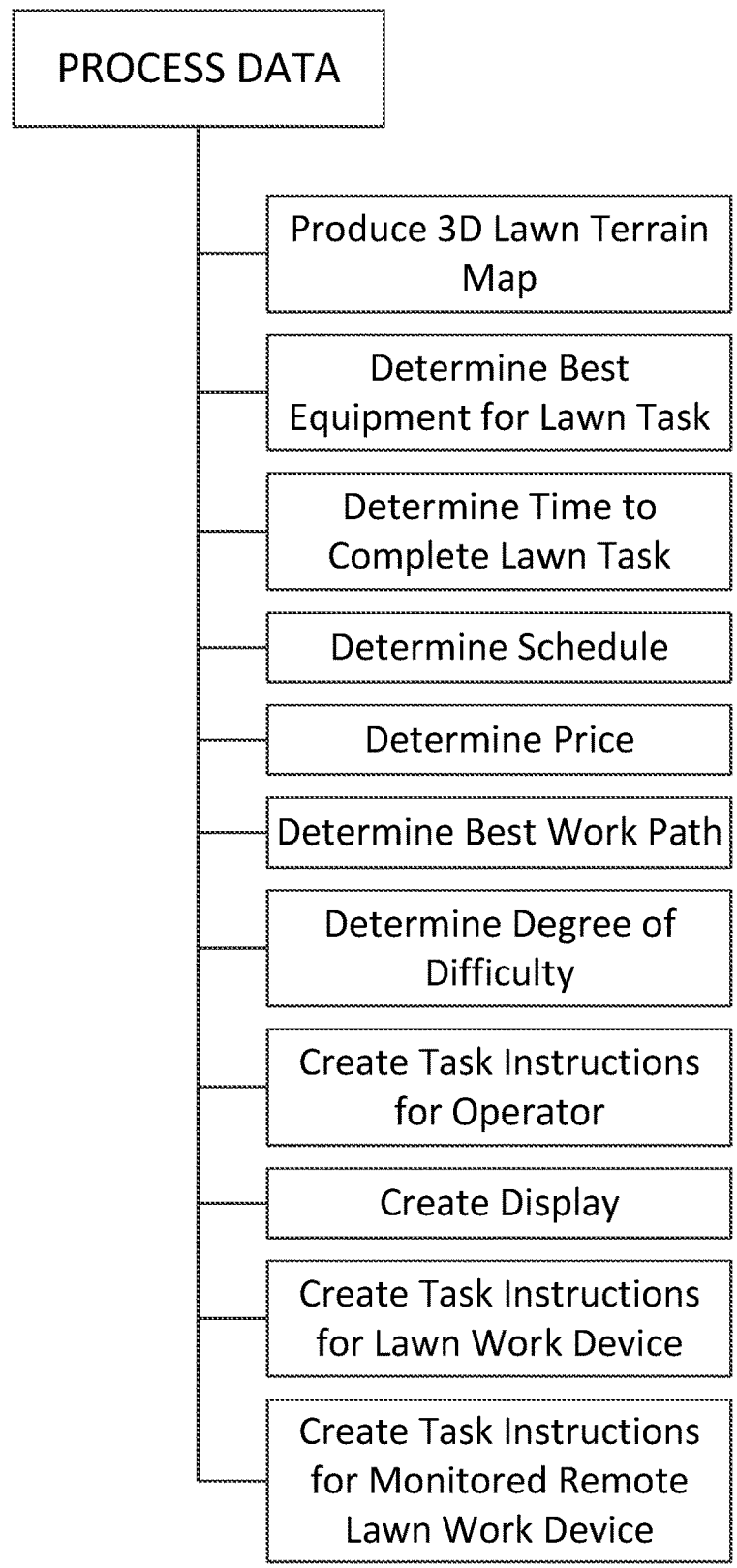
FIG. 5 is a diagram of possible data outputs using the method of the present application.

The sensor data set is transmitted to a processor and analyzed using appropriate software to generate a number of outputs to improve operating efficiency, some of which are shown in FIG. 5. For example, software can be applied to the data set to convert the geographic position, pitch and roll data into a three-dimensional terrain map of the lawn (e.g., a contour map). The contour map can include the perimeter and contours of the mowing surface along with the size, shape and position of specific structures and features within and around the mowing surface. In a further embodiment, an operator can provide through direct input supplemental information by identifying specific structures and features with the GPS equipment, mapping software and the like.

Other useful outputs can include the total operation time, cost, and price to cut an entire lawn, or portion thereof; instructions for an operator regarding the selection of equipment; and instructions regarding an efficient mowing path. Where the mower is autonomous, mowing instructions can be created based on the previously created terrain map and initiation of mowing at the initial position point, with modifications to the path, speed, and acceleration to account for terrain, structures and features on the lawn.

Commercial applications can also utilize a plurality of maps and best practice information from a client base to efficiently and cost-effectively schedule the day-to-day activities of a commercial mowing fleet. Best practice information can be transmitted from a processor to one or more locations including an operator's handheld computing device for display and data storage, a vehicle processor for data storage and auto control; and a different vehicle for data storage and auto control.

Having described the invention in detail with reference to certain preferred embodiments, it will be appreciated that variations and modifications exist within the scope and spirit of the present application.

What is claimed is:

1. A system for use with a plurality of lawn mowers of different types, the system comprising:
    a remote processor in wireless communication with the plurality of mowers, wherein the remote processor is configured to:
    acquire geographic location data of the plurality of mowers as the plurality of mowers travel according to a first schedule;
    acquire sensor data from the plurality of mowers, the sensor data comprising pitch data and roll data of the plurality of mowers;
    generate one or more maps based on the geographic location data, the pitch data, and the roll data acquired from the plurality of mowers;
    determine, at least partially based on the one or more maps, an operational efficiency of the plurality of mowers that are operating according to the first schedule; and
    determine, at least partially based on the one or more maps, a second schedule for the plurality of mowers that increases the operational efficiency of the plurality of mowers relative to the first schedule.

2. The system of claim 1, wherein the remote processor is configured to acquire the geographic location data and the sensor data to determine relative positions, orientations, and motions of the plurality of mowers.

3. The system of claim 1, wherein at least one of the one or more maps generated by the remote processor is a three-dimensional contour map.

4. The system of claim 1, wherein, to increase the operational efficiency of the plurality of mowers, the remote processor is configured to determine the second schedule to reduce at least one of a project time and energy consumption.

5. The system of claim 1, wherein, to increase the operational efficiency of the plurality of mowers, the remote processor is configured to determine at least one of mower types and mower paths for the second schedule.

6. The system of claim 1, wherein the remote processor is configured to determine the operational efficiency of the plurality of mowers at least partially based on the sensor data.

7. The system of claim 6, wherein the sensor data of the plurality of mowers further includes data selected from a group consisting of speed, velocity, acceleration, power usage, fuel usage, wheel speed, revolutions per minute, engine speed, and combinations thereof.

8. A system for use with a plurality of lawn mowers, the system comprising:
    a remote processor in wireless communication with a plurality of portable devices, wherein each of the plurality of portable devices is physically connected to one of the plurality of mowers, wherein the remote processor is configured to:
    acquire geographic location data collected by GPS receivers of the plurality of portable devices as the plurality of mowers travel according to a first schedule;
    acquire sensor data from the plurality of portable devices, the sensor data comprising pitch data and roll data collected by one or more sensors of the plurality of portable devices;
    generate one or more maps based on the geographic location data and the sensor data acquired from the plurality of portable devices;
    determine, based at least in part on the one or more maps, an operational efficiency of the plurality of mowers that are operating according to the first schedule; and
    determine, based at least in part on the one or more maps, a second schedule for the plurality of mowers that increases the operational efficiency of the plurality of mowers relative to the first schedule.

9. The system of claim 8, wherein the remote processor is further configured to transmit at least one of the one or more maps to at least one of the plurality of portable devices to enable the at least one of the plurality of portable devices to present the one or more maps.

10. The system of claim 8, wherein the remote processor is configured to acquire the geographic location data and the sensor data to determine relative positions, orientations, and motions of the plurality of mowers.

11. The system of claim 8, wherein at least one of the one or more maps generated by the remote processor is a three-dimensional contour map.

12. The system of claim 8, wherein, to increase the operational efficiency of the plurality of mowers, the remote processor is configured to determine the second schedule to reduce at least one of a project time and energy consumption.

13. The system of claim 8, wherein, to increase the operational efficiency of the plurality of mowers, the remote processor is configured to determine at least one of mower types and mower paths for the second schedule.

14. The system of claim 8, wherein the remote processor is configured to determine the operational efficiency of the plurality of mowers at least partially based on the sensor data.

15. The system of claim 14, wherein the sensor data of the plurality of mowers acquired via the plurality of portable devices further includes data selected from a group consisting of speed, velocity, acceleration, power usage, fuel usage, wheel speed, revolutions per minute, engine speed, and combinations thereof.

16. The system of claim 8, wherein the one or more sensors of the plurality of portable devices comprise at least one accelerometer in each of the plurality of portable devices.

17. A method for a remote processor used for controlling a plurality of lawn mowers, the method comprising:

communicatively coupling with a plurality of portable devices, wherein each of the plurality of portable devices is physically connected to one of the plurality of mowers;

acquiring, from the plurality of portable devices, geographic location data collected by GPS receivers of the plurality of portable devices as the plurality of mowers travel according to a first schedule;

acquiring sensor data from the plurality of portable devices, the sensor data comprising pitch data and roll data collected by one or more sensors of the plurality of portable devices;

generating one or more maps based on the geographic location data and the sensor data acquired from the plurality of portable devices; and determining, based at least in part on the one or more maps, an operational efficiency of the plurality of mowers that are operating according to the first schedule; and determining, based at least in part on the one or more maps, a second schedule for the plurality of mowers that increases the operational efficiency of the plurality of mowers relative to the first schedule.

18. The method of claim 17, further including transmitting at least one of the one or more maps to at least one of the plurality of portable devices to enable the at least one of the plurality of portable devices to present the one or more maps.

19. The method of claim 17, wherein at least one of the one or more maps is a three-dimensional contour map.

20. The method of claim 17, wherein determining the second schedule to increase the operational efficiency of the plurality of mowers includes determining at least one of mower types and mower paths for the second schedule to reduce at least one of a project time and energy consumption.

21. The method of claim 17, wherein the operational efficiency of the plurality of mowers is further determined at least partially based on the sensor data, wherein the sensor data further includes data selected from a group consisting of speed, velocity, acceleration, power usage, fuel usage, wheel speed, revolutions per minute, engine speed, and combinations thereof.

* * * * *